UNITED STATES PATENT OFFICE.

HOWARD R. CONNELL, OF BRACKENRIDGE, PENNSYLVANIA, ASSIGNOR TO GENERAL ELECTRIC COMPANY, A CORPORATION OF NEW YORK.

METHOD OF MAKING METER-JEWELS.

1,023,299.      Specification of Letters Patent.      Patented Apr. 16, 1912.

No Drawing.      Application filed January 5, 1909. Serial No. 470,849.

*To all whom it may concern:*

Be it known that I, HOWARD R. CONNELL, a citizen of the United States, residing at Brackenridge, in the county of Allegheny, State of Pennsylvania, have invented certain new and useful Improvements in Methods of Making Meter-Jewels, of which the following is a specification.

My present invention relates to the production of metal beads or jewels suitable for use as bearings in electrical meters and for other purposes.

According to my present invention the cupping and cementation of a tungsten or other metal bead is performed in a single operation.

I have found that when tungsten is fused in contact with a graphite body in a carbon tube resistance furnace the melted tungsten or tungsten carbid assumes a concaved or cupped upper surface. I make use of this principle in producing cupped and carburized beads for use as meter jewels. As the preferred embodiment I start with a dense homogeneous bead of tungsten or equivalent carburizable metal, made by fusion of a tungsten wire run as anode in a mercury arc and then retained molten for a time long enough to degasify. A plurality of these beads are fitted in cup-like depressions made in the top of a graphite boat or slab. Each depression should be about the same size as the bead itself, and may be semispherical in outline. The slab or boat with its charge of tungsten beads is then pushed into a carbon tube furnace of the resistance type and there heated to cause the carbon of the boat and the carbon vapors of the furnace to enter the bead of tungsten and reduce its melting point. Probably a carbid forms, at least on the surface, and, at all events, the beads fuse down and take the shape of the cupped depression, attacking somewhat the boat or slab and taking up appreciable quantities of carbon. By careful regulation of the temperature a hard shiny cupped bead may be obtained, which can be easily finished and polished in the usual way. These beads can then be mounted as a bearing in recording electric meters, to serve as substitutes for sapphires and other native jewels heretofore so extensively used for that purpose.

As an alternative method of procedure, I may press powdered tungsten into the cuplike depressions and then heat and carburize as before, though with this procedure I do not have the advantage of a wholly gas-free material, as is the case when I start with a dense homogeneous bead. As a still further modification I may take rough pieces of scrap tungsten broken to suitable size, and use these in place of the dense beads above referred to. When using scrap tungsten or when using compressed powdered tungsten the metal takes up carbon and fuses with a concaved surface, as in the case when beads are used.

What I claim as new and desire to secure by Letters Patent of the United States, is:

1. The method of making cupped meter bearings which consists in fusing a carburizable metal in a carbon mold, the external dimensions of which approximate the dimensions desired in the bearing.

2. The method of producing a cupped tungsten bead, which consists in fusing tungsten in a cup-shaped depression in a carbon block thereby shaping and hardening the tungsten.

3. The method of making cupped tungsten jewels which consists in fusing a dense homogeneous tungsten bead in the presence of carbon vapor while in a mold.

4. The method, which consists in heating tungsten to a high temperature in a carbon mold containing a small cavity, thereby causing the tungsten to take up carbon and assume a shape having a cupped or concave upper surface.

In witness whereof, I have hereunto set my hand this thirty first day of December 1908.

HOWARD R. CONNELL.

Witnesses:
    JESSE COATES,
    DAVID BLACK.